United States Patent
Bhandari et al.

(10) Patent No.: US 10,495,232 B2
(45) Date of Patent: Dec. 3, 2019

(54) DUAL PATH DUAL PURGE VALVE SYSTEM AND VALVE ASSEMBLY FOR TURBO BOOSTED ENGINE

(71) Applicant: Padmini VNA Mechatronics Pvt. Ltd., Gurgaon (IN)

(72) Inventors: Kabir Bhandari, Gurgaon (IN); Torsten Gerlich, Gurgaon (IN); Amardip Kumar, Gurgaon (IN)

(73) Assignee: Padmini VNA Mechatronics Pvt. Ltd. (IN)

( * ) Notice: Subject to any disclaimer, the term of this patent is extended or adjusted under 35 U.S.C. 154(b) by 33 days.

(21) Appl. No.: 16/063,633

(22) PCT Filed: Dec. 29, 2016

(86) PCT No.: PCT/IB2016/058078
§ 371 (c)(1),
(2) Date: Jun. 18, 2018

(87) PCT Pub. No.: WO2017/115318
PCT Pub. Date: Jul. 6, 2017

(65) Prior Publication Data
US 2018/0372238 A1    Dec. 27, 2018

(30) Foreign Application Priority Data
Dec. 29, 2015   (IN) ........................... 4306/DEL/2015

(51) Int. Cl.
*F16K 31/06*   (2006.01)
*F02D 23/00*   (2006.01)
(Continued)

(52) U.S. Cl.
CPC .......... *F16K 31/0693* (2013.01); *F02D 23/00* (2013.01); *F02D 41/0007* (2013.01);
(Continued)

(58) Field of Classification Search
CPC .. F02B 29/0406; F02D 23/00; F02D 41/0007; F05D 2220/40; F16K 1/36; F16K 31/0655; F16K 31/0693; Y02T 10/144
See application file for complete search history.

(56) References Cited

U.S. PATENT DOCUMENTS 2,783,019 A * 2/1957 Houghton ............. F16K 31/406
251/30.02
5,083,546 A    1/1992 Detweiler et al.
(Continued)

OTHER PUBLICATIONS

Written Opinion of the International Searching Authority for International Application No. PCT/IB2016/058078 dated May 2, 2017, pp. 1-4.

*Primary Examiner* — Jesse S Bogue
(74) *Attorney, Agent, or Firm* — Winstead, P.C.

(57) ABSTRACT

The invention relates to a dual path dual purging system and valve assembly for turbo boosted engines. More specifically, the invention provides an integrated valve assembly connected to facilitate the operation of the low flow valve as a pilot valve for the high flow valve and a system to implement it on turbocharged or supercharged engines. The invention relates to a dual path dual purging system with two purge valves connected to facilitate the use of the low flow valve to be operated as a pilot valve for the high flow valve. This smart routing provides pressure compensation for the high flow valve, when the valve is enabled. This decreases the requirement of force for the high flow valve and gives an option to install a smaller cost efficient solenoid valve.

6 Claims, 8 Drawing Sheets

(51) Int. Cl.
   *F16K 1/36*    (2006.01)
   *F02D 41/00*   (2006.01)
   *F02B 29/04*   (2006.01)

(52) U.S. Cl.
   CPC ............ *F16K 1/36* (2013.01); *F16K 31/0655* (2013.01); *F02B 29/0406* (2013.01); *F05D 2220/40* (2013.01)

(56) References Cited

U.S. PATENT DOCUMENTS

| | | | | |
|---|---|---|---|---|
| 5,848,608 | A * | 12/1998 | Ishigaki | F16K 31/1225 137/599.16 |
| 7,163,025 | B2 * | 1/2007 | Kajitani | F16K 41/10 137/601.13 |
| 7,401,760 | B2 * | 7/2008 | Kanzaka | F16K 51/02 251/63 |
| 7,770,598 | B2 * | 8/2010 | Bittner | F16K 31/0655 137/630.15 |
| 9,027,590 | B2 * | 5/2015 | Gerlich | F16K 39/024 137/493.9 |
| 2003/0132409 | A1 * | 7/2003 | Birkelund | F16K 31/408 251/30.04 |
| 2013/0319379 | A1 * | 12/2013 | Hettinger | F16K 39/024 123/520 |

* cited by examiner

DUAL PATH DUAL PURGE VALVE SYSTEM AND VALVE ASSEMBLY FOR TURBO BOOSTED ENGINE

FIELD OF THE INVENTION

The invention relates to a dual path dual purging system and valve assembly for turbo boosted engines. More specifically, the invention provides an integrated valve assembly connected to facilitate the operation of the low flow valve as a pilot valve for the high flow valve and a system to implement it on turbocharged or supercharged engines.

BACKGROUND OF THE INVENTION

Fuel vapour purging systems are generally known and used in different types of vehicles. Fuel vapours are collected and stored temporarily in a canister during periods of a vehicle being in-operative. The vapours are selectively directed to the combustion chamber for burning when the engine is running by drawing air from the atmosphere through the canister, which is referred to as purge operation.

A typical layout of fuel vapour purging system for turbo charged engines comprises of a T-joint, two check valves and a purge valve, which can be operated in duty cycle mode, supplements purge flow under any operating conditions of the engine. Purge systems of this kind with two discharge points (one into the intake manifold, the other to the low-pressure side of the compressor) are commonly known as dual purge systems.

Dual purge systems typically use two check valves. During a first mode of operation, vacuum pressure places the first check valve in an open position and the second check valve in a closed position. In a second mode of operation, pressurized air places the first check valve in a closed position. The second check valve is placed in an open position by vacuum pressure coming either from the pressure sink in front of the compressor stage of the turbocharger or from an additional device like an ejector using a sonic nozzle which converts boosted air into vacuum pressure.

The technical challenge of fitting the purge systems is typically balancing the purging during idle speed (without turbo boost) and above idle speed (engaging turbo booster) i.e. Canister purge valves in general have to fulfil two requirements: low flow operation with high precision metering in normally aspirated mode and high flow capability with low flow restrictions in boost mode. Both requirements are difficult to combine in one valve as the requirements are diverging.

During idle speed and away from turbo boost normally aspirated mode prevails. Fuel vapours are purged from the canister by utilizing the intake manifold's vacuum pressure to draw air through the canister. Typically, during this mode the vacuum pressure is on such a high level, that a very precise metering of the purge valve is required to prevent the engine from running rich in case of purging with a too high flow rate. This precise metering is achieved by running the purge valve in duty cycle mode driven by a PWM-signal.

At above idle speeds while turbo boost is/are engaged, there is no vacuum in the intake manifold to draw air through the canister. The vacuum pressure is created in before the compressor stage of the turbo, which is utilized as the driving force for the purging operation, however the pressure created is very low. Therefore, to provide secure purging from the canister under such conditions, any pressure loss in the purge line needs to be minimized.

The state of the art solution provides additional applications by using additional devices like an ejector using a sonic nozzle, which converts boosted air into vacuum pressure, so that air can be drawn through the canister to purge fuel vapours therefrom. Other solutions include using a dual path dual purge valve system consisting of two different valves. The first valve for normally aspirated mode is a small valve, which enables low flow operation with high precision metering during valve opening; and implementing the second valve for boost mode is a valve with very low flow restriction to be operated in On/Off mode with a sonic Laval-nozzle. The flow behaviour especially at low-pressure gradients, which are available during boost mode in front of the compressor (10 kPa), can be boosted up by using a sonic Laval-nozzle. The requirement for this valve is to allow a high mass flow at low-pressure gradient. In boost mode, the high flow valve has to open a large pressure-impacted cross section, which requires high magnetic forces. However, due to the pressure-impacted across section the best performance is compromised thereby limiting the force available from the solenoid used in the purge valve. Thus, classic high flow valves cannot give the best performance at low-pressure gradients as required.

The closest prior art include examples the use of the low flow valve as a pilot valve for the high flow valve:

US20080290306A1 suggests concept to be applied to a purge valve for purging evaporated fuel stored in a canister to an intake pipe of an engine. The purge valve has a fluid passage connecting an inlet port and an outlet port, and a normally closed valve port that is selectively opened by operation of an electromagnetic actuator is disposed in the fluid passage. A barrier pillar is disposed in the fluid passage between the inlet port and the valve port to suppress transmission of pulsating waves generated in the purge valve to the canister. Flow resistance of the barrier pillar is higher in a reverse flow direction from the valve port to the inlet port than in a normal flow direction from the inlet port to the valve port. The transmission of the pulsating waves is well suppressed by the barrier pillar while allowing a smooth flow from the canister into the purge valve.

U.S. Pat. No. 5,720,469A teaches a two-port electromagnetic valve. The electromagnetic valve incorporates a first port, a second port and a passage for communicating the first and second ports and a cylindrical bobbin having an electrical coil. A fixed core is arranged inside the cylindrical bobbin and has an inner space defined therein. A movable core is arranged near the fixed core. A valve is connected with the movable core for opening and closing the passage between both the ports. An insert member is arranged into the inner space of the fixed core.

US20060243939A1 describes an electromagnetic valve which generally has a housing, a valve element, an electromagnetic driving portion and a filter. The housing forms a fluid flow passage therein. The valve element is installed in the housing to control a flow of a fluid through the fluid flow passage. The electromagnetic driving portion is installed in the housing to generate a magnetic attraction force when it is energized to actuate the valve element. At least a part of the electromagnetic coil is within the fluid flow passage. The filter is installed in the fluid flow passage on an upstream side of the at least a part of the electromagnetic driving portion to filtrate the fluid flowing through the fluid flow passage.

Therefore, in view of the drawbacks highlighted, the present invention provides a dual path dual purging system and valve assembly for turbo boosted engines having two different valve functions into one.

OBJECT OF THE INVENTION

The primary object of the invention is to provide a dual path dual purging system and a valve assembly for turbo boosted engine.

Yet another object of the invention is to provide a dual path dual purging system with two purge valves connected to facilitate the use of the low flow valve as a pilot valve for the high flow valve.

Yet another object of the invention is to provide an integrated valve assembly connected to facilitate the operation of the low flow valve as a pilot valve for the high flow valve.

Yet another object of the invention is to provide a dual purge valve assembly with lower force requirements to engage the high flow valve and further provides an option for a small cost efficient solenoid valve.

Yet another object of the invention is to provide a dual purge valve assembly by integrating the low flow duty cycle valve onto the high flow control valve (On/Off) using the same solenoid for both valves.

Yet another object of the invention is to provide dual purge valve assembly by simplifying the purging system compared to the version with two individual solenoid valves.

Yet another object of the invention is to provide a dual purge valve assembly that is operable in duty cycle mode and high flow mode.

Yet another object of the invention is to provide a dual purge valve assembly with high reproducibility during production, by adjusting the opening of the inner armature provided either by positioning the fixed core inside the bobbin, or by modifying the spring tension with a screw in the fixed core.

Yet another object of the invention is to provide a dual purge valve assembly to allow a low flow operation with high precision metering in normally aspirated mode and high flow capability with low flow restrictions in boost mode.

Yet another object of the invention is to provide a dual path dual purging system that accommodates additional devices that are optionally installed, such as ejectors, using a sonic nozzle that converts the boosted air into vacuum pressure.

Yet another object of the invention is to provide a dual path dual purging system and device that is cost economical.

Yet another object of the invention is to provide a dual path dual purge valve system and device that is compatible to all turbo boosted or supercharged engines.

SUMMARY OF THE INVENTION

The present invention provides a dual path dual purging system and valve assembly for turbo boosted or super charged engine.

In an embodiment of the present invention, the invention relates to a dual path dual purging system with two purge valves connected to facilitate the use of the low flow valve to be operated as a pilot valve for the high flow valve. This smart routing provides pressure compensation for the high flow valve, when the valve is enabled. This decreases the requirement of force for the high flow valve and gives an option to install a smaller cost efficient solenoid valve.

In case of naturally aspirated mode, fuel vapours are purged from the canister by utilizing the intake manifold's vacuum pressure, drawing the air through the canister by assisted precise metering of the purge valve, required to prevent the engine from running rich in case of purging with a too high flow rate.

In boost mode, the high flow valve has to open a large pressure-impacted cross-section, which requires high magnetic forces, as described afore. Therefore, the present invention provides a connection downstream between the two solenoid valves, the low flow valve can be used as pilot valve for the high flow valve. Further, both valves are actuated together; the low flow valve will open immediately and enable a pressure balance over the high flow valve. The high flow valve will open to balance pressure and is design to utilize a low force, cost efficient solenoid. In addition, optionally the high flow valve can be equipped with an ideal Laval-nozzle to enable best performance also at low-pressure gradients.

In yet another embodiment of the current invention, the dual path dual purge valve system presented herein is used integrating the low flow duty cycle valve onto the high flow control valve (On/Off), using the same solenoid for both valves.

In yet another embodiment of the present invention, the plumbing of the purge system is simplified significantly compared to the version with two individual solenoid valves. This further provides a cost advantage against conventional built.

In an embodiment of the current invention, the valve is operated in duty cycle mode, the inner armature of the valve moves between its two end positions against the inner spring, i.e. the fixed core of the solenoid and the outer armature. The outer armature is kept in place by the outer spring. During operation, the inner armature is guided by a bush, which is assembled into the outer armature. The flow through the outer armature is enabled through radial communicating orifices in the armature. As the inner valve is operated in duty cycle mode only, the orifice in the centre of the outer armature determines the real amount of the flow. An advantageous embodiment of the invention is a machined sealing edge on the inner armature, which seals against the rubber of the outer armature. The inner armature is a machined metal component or sintered metal preferably, whereas the outer armature is most preferably an elastomeric composite part incorporating all required sealing areas of the purge valve.

In case of high flow mode both armatures are moved to their end positions and the maximum cross section is available for the purge flow. As guidance of the outer armature, ridges or standard bush can be implemented into the bobbin of the solenoid. This guidance made of plastic or polymer is sufficient, as the number of full strokes can be assumed much lower than for the inner armature, as it is operated either in On/Off mode only. As soon as the magnetic force can actuate the outer armature, the valve is fully open. Due to inertia of the both armatures together, the duty cycle behaviour does not occur. The set point for opening the high flow valve can be adjusted by the spring tension of the outer spring. The inner low flow valve provides the high precision for naturally aspirated mode and the outer high flow valve gives the high flow capability. The package requirement of a valve with the invented features does not necessarily exceed the package boundaries of a standard conventional purge valve. With this invention the plumbing of the purge system will be simplified significantly compared to the version with two individual solenoid valves. Furthermore, this leads to a cost advantage against a built solution.

In yet another embodiment, to achieve a high reproducibility during production an adjustment of the opening, of the inner armature, is provided either by positioning the fixed core inside the bobbin, or by modifying the spring tension with a screw in the fixed core.

In yet another embodiment of the present invention provides a method of connection downstream between the two solenoid valves thereby the low flow valve can be used as pilot valve for the high flow valve, wherein both valves are actuated together, therefore the low flow valve will open immediately and enable a pressure balance over the high flow valve.

In yet another embodiment of the present invention provides the high flow valve to open for balancing the pressure and designed to lower the force, implementing a cost efficient solenoid. Additionally, the high flow valve can be equipped with an ideal Laval-nozzle to enable best performance also at low-pressure gradients.

BRIEF DESCRIPTION OF THE DRAWINGS

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

DETAILED DESCRIPTION OF THE INVENTION

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Figure 1:
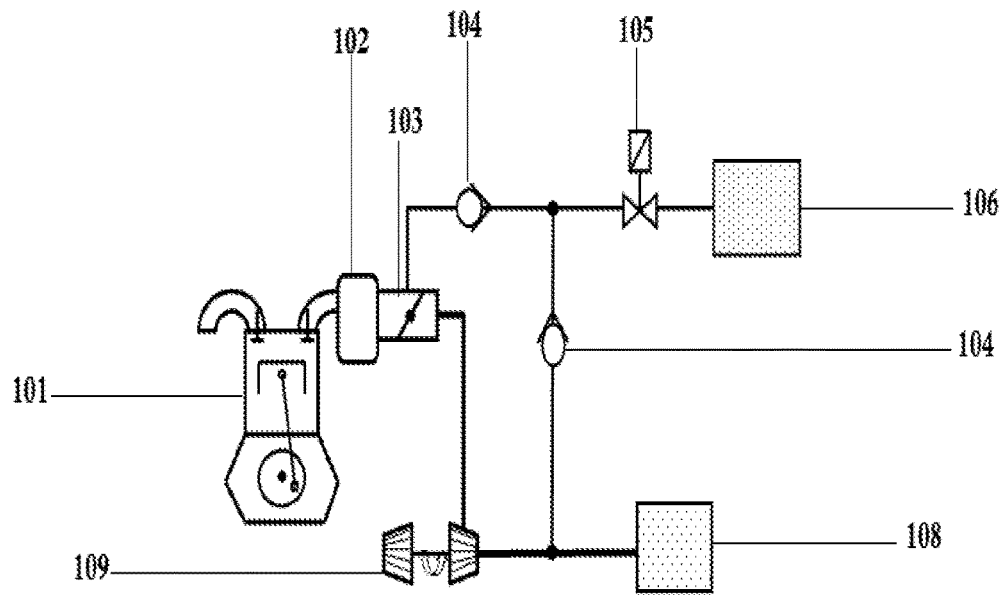
FIG. 1 is the layout of a conventional dual path dual purging system.

As shown in FIG. 1, the layout of a conventional dual path dual purge valve system is illustrated. The valve system comprising of Engine 101, Intake Manifold 102, Throttle Valve 103, Check valve 104, Canister Purge Valve 105, Carbon Canister 106, Air Filter 108, and Turbo Charger 109.

Figure 2:
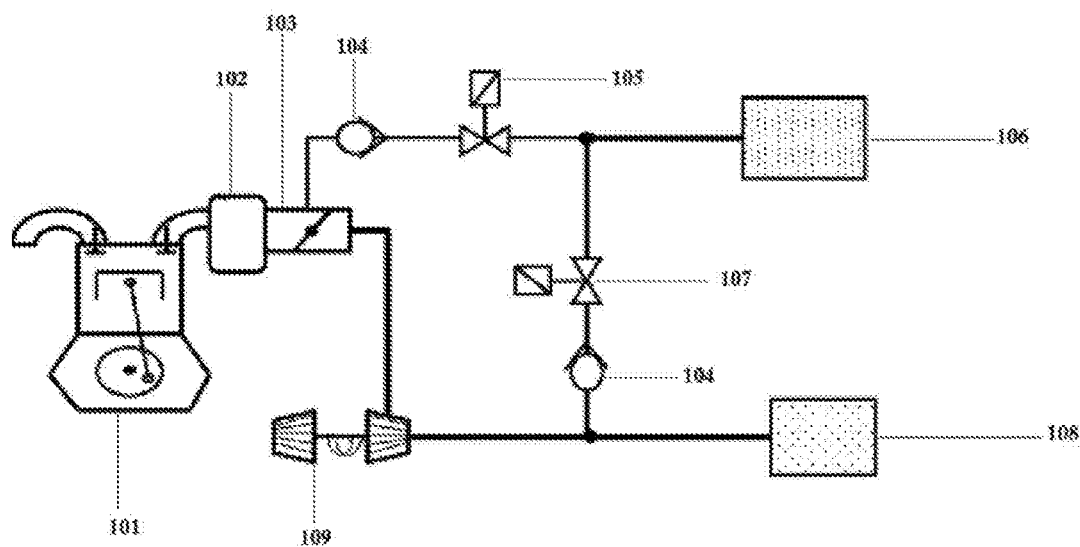
FIG. 2 is the layout of dual path dual purging system in accordance with the present invention.

As shown in FIG. 2, a layout of dual path dual purge valve system in accordance with the present invention is illustrated. The valve system comprises of Engine 101, Intake Manifold 102, Throttle Valve 103, Check valve 104, Duty Cycle Canister Purge Valve 105, Carbon Canister 106, High Flow On/Off valve 107, Air Filter 108, and Turbo Charger 109.

Figure 3:
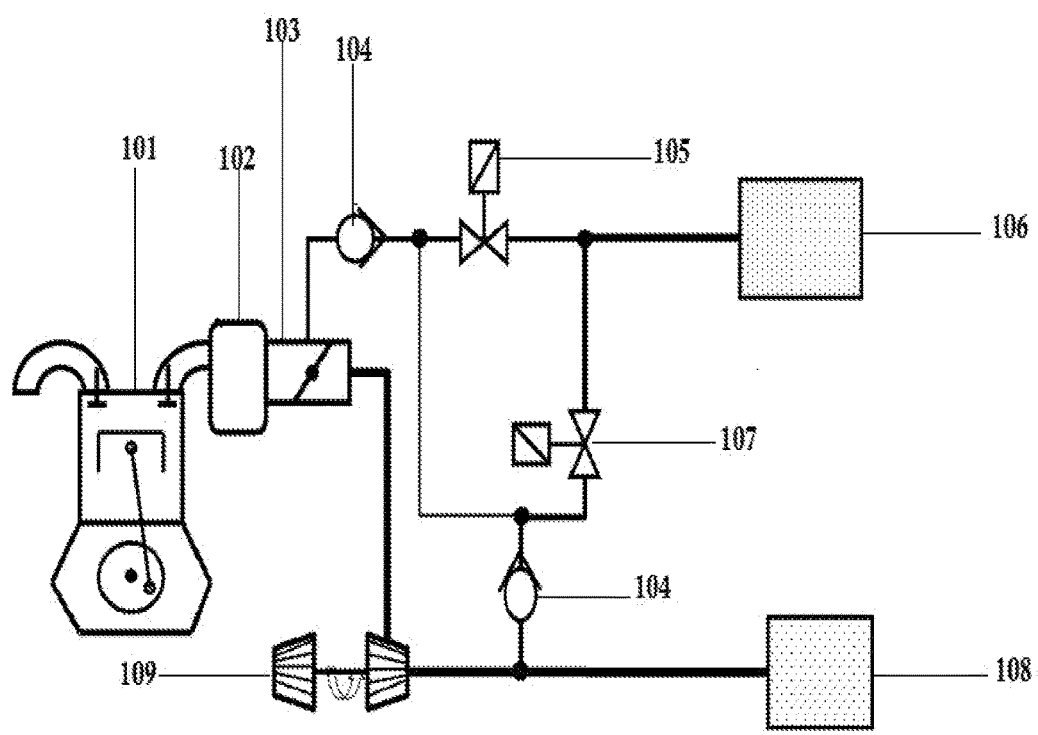
FIG. 3 is the layout of dual path dual purging system with pressure compensation in accordance with the present invention.

As shown in FIG. 3, a layout of dual path dual purging system with pressure compensation is elucidated as per the preferred embodiment of the present invention. The dual path dual purging system presented herein is used integrating the low flow duty cycle valve onto the high flow control valve (On/Off) using the same solenoid for both valves. The present invention provides a dual path dual purging system with two purge valves connected in such a way, that the low flow valve (Canister Purge Valve 105) is operated as a pilot valve for the high flow valve (high flow On/Off valve 107). With this smart routing a pressure compensation for the high flow valve is enabled. This leads to a lower force requirement of the high flow valve and gives the option for a small, cost efficient solenoid valve.

Figure 4:
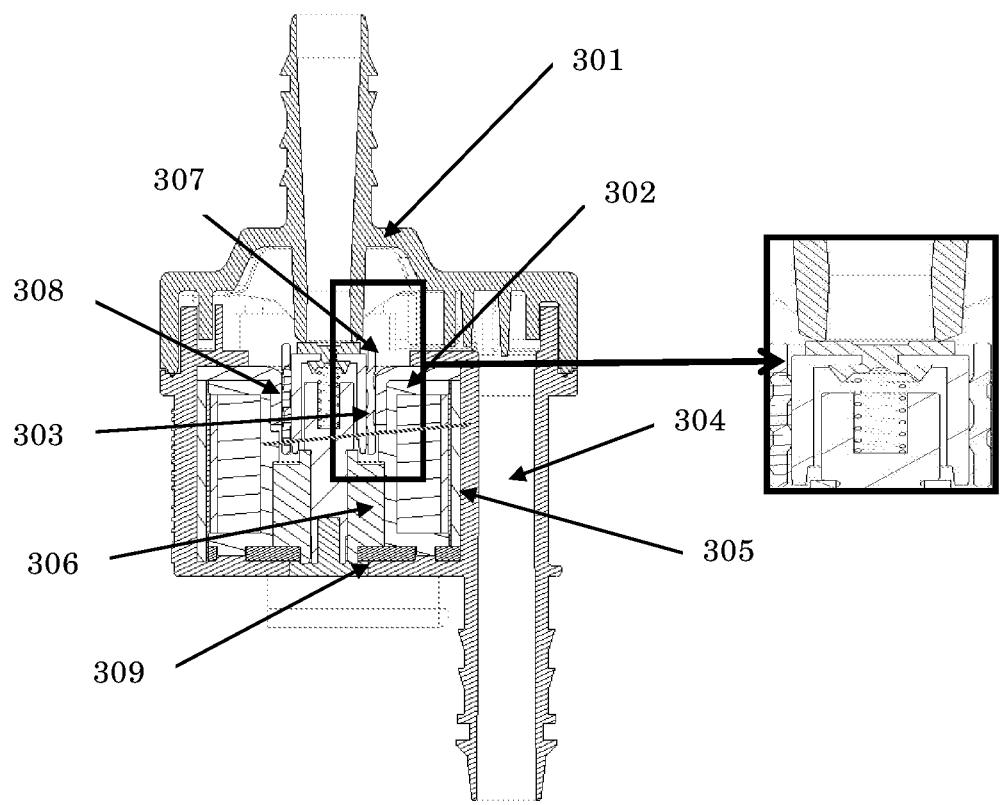
FIG. 4 is the conventional dual path purging system showing magnified view of the valve system.

As shown in FIG. 4, the convention dual path purge valve is elucidated comprising of nozzle 301, moving core 302, spring 303, housing 304, coil 305, screw 306, sealing rubber 307, bobbin 308 and sealant 309.

Figure 5:
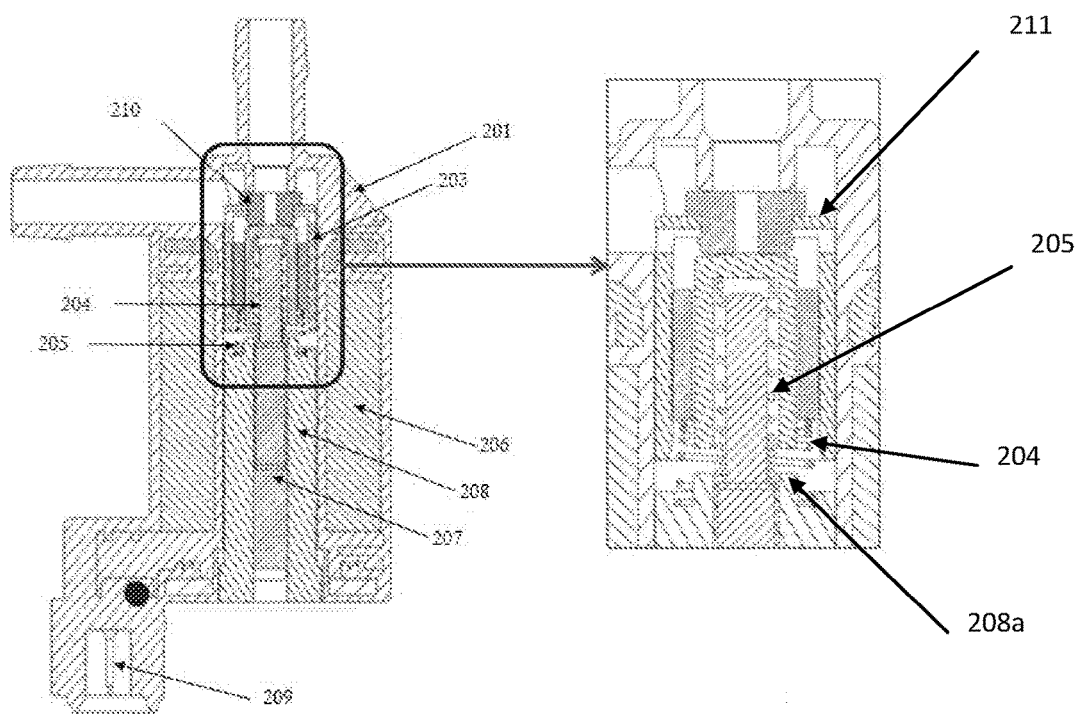
FIG. 5 is the dual path purging system showing magnified view of the valve system in accordance with the present invention.

As shown in FIG. 5, the modified dual path purge valve is elucidated comprising of housing 201, small moving core 202, big moving core 203, small spring 204, big spring 205, coil 206, threaded pin 207, fix core 208, terminal 209 and sealing rubber 210. The de-energized state wherein integration of the low flow duty cycle valve into the high flow On/Off valve is done, using the same solenoid for both valves, is illustrated. In de-energized state both armatures are kept in default closed position by individual springs, no flow can occur, the system is sealed.

Figure 6A:
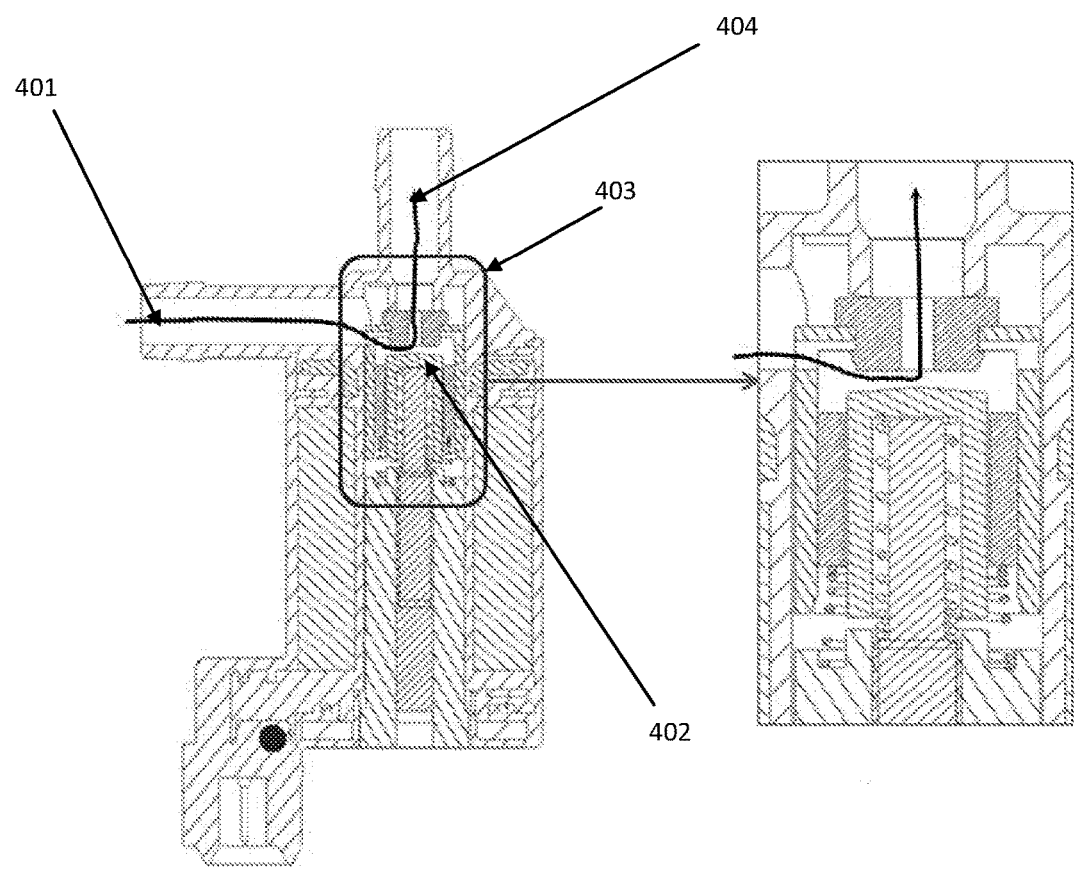
FIG. 6(a) is the modified dual path purge valve in low flow duty cycle mode.

As shown in FIG. 6(a), the figure illustrates the working in case the valve is operated in duty cycle mode of operation, wherein the purging is done from the Canister Port 401, and regulated by the valves (Low Flow Valve 402, High Flow Valve 403) and Engine Port 404. The working is illustrated in case the valve is operated in duty cycle mode, wherein small moving core 202 of the dual purge valve moves between its two end positions against the inner spring, i.e. the fixed core of the solenoid and the outer armature. The big moving core 203 is kept in place by the outer spring. During operation, the small moving core 202 is guided by a bush, which is assembled into the big moving core 203. The flow through the big moving core 203 is enabled through radial communicating orifices in the armature. To achieve a high reproducibility during production an adjustment of the opening of the small moving core 202 can be provided either by positioning the fixed core 208 inside the bobbin, or by modifying the spring tension with a screw in the fixed core 208. The orifice in the centre of the big moving core 203 determines the real amount of the flow.

Figure 6B:
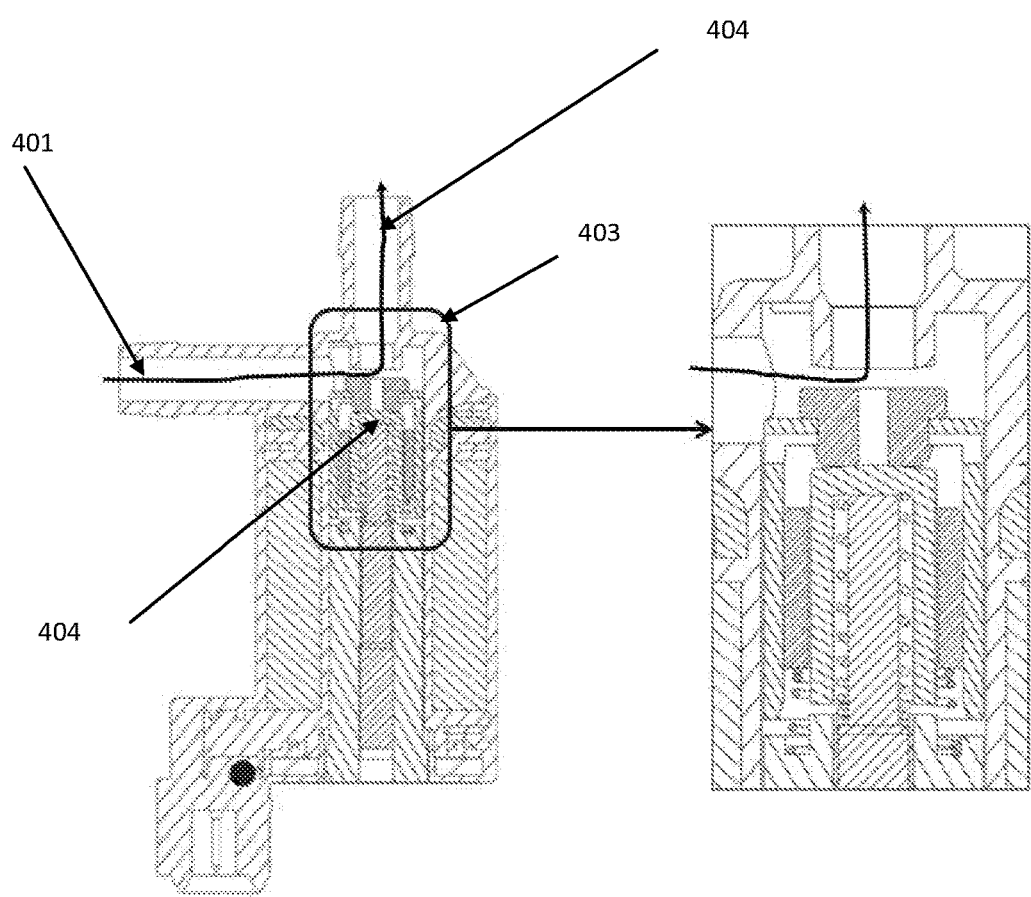
FIG. 6(b) is the working mode in case the valve is operated in high flow mode.

As shown in FIG. 6(b), the working is illustrated in case the valve is operated in high flow mode, in case of high flow mode both big moving core 203 and small moving core 202 are moved to their end positions and the maximum cross section is available for the purge flow. As guidance of the big moving core 203, ridges may be optionally implemented into the bobbin of the solenoid. The preferable material for guidance is plastic; however other durable polymers or metals may also be implemented. The number of high flow mode is much lower than for the inner armature, as it is operated in On/Off mode only. As soon as the magnetic force actuates the big moving core 203, the valve is fully opened.

Due to inertia of the both big moving core 203 and small moving core 202 together, duty cycle behaviour does not occur. The set point for opening the high flow valve is adjusted by the spring tension of the big spring (205). The small moving core 202 provides precision flow for naturally aspirated mode and the big moving core 203 provides high flow capability to the valve. The package requirement of a valve with the invented features does not necessarily exceed the package boundaries of a standard conventional purge valve. The figure shows the high flow or turbo mode of operation, by elucidating the gas flow pathway, wherein the fuel is purged from the Canister Port 401 regulated via Low Flow Valve 402 and High Flow Valve 403; and is further fed to the engine via an Engine Port 404.

Figure 7A:
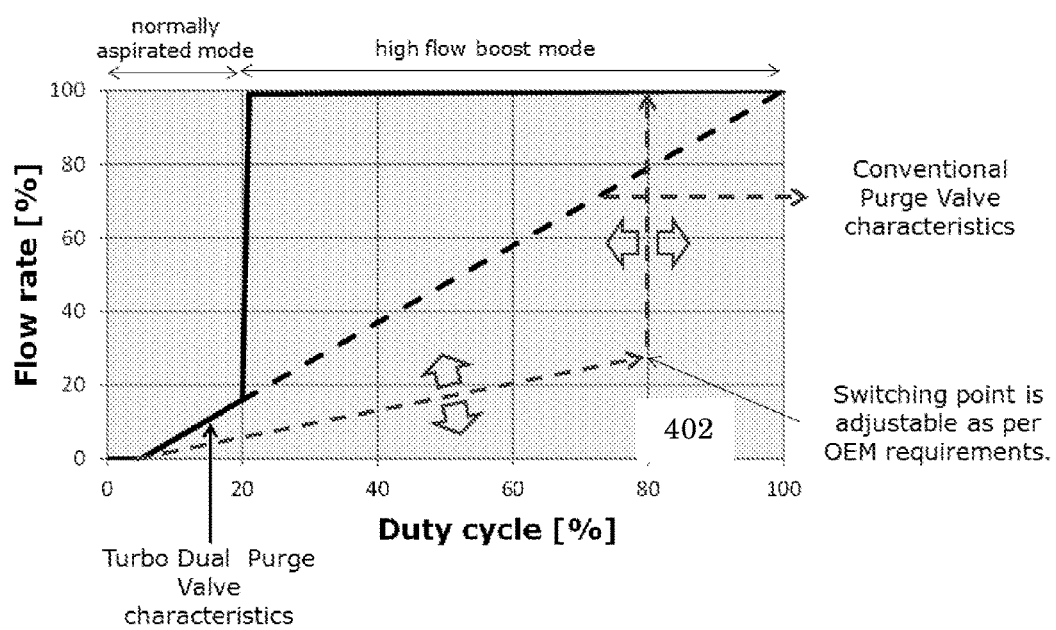
FIG. 7(a) is the characteristic opening behaviour of a low flow duty cycle purge valve in accordance with the present invention.
Figure 7B:
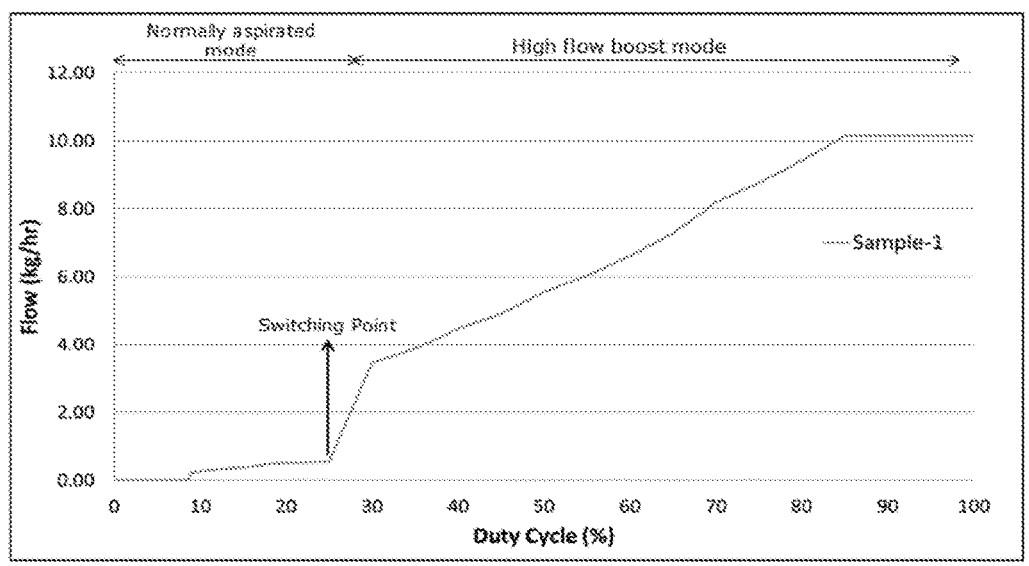
FIG. 7(b) is the flow characteristic of the dual path dual purge valve in accordance with the present invention.

The flow curve is compared to a conventional high flow valve as exclusively illustrated in FIG. 7(a) with flow characteristic of the dual path dual purge valve in FIG. 7(b) (with the dashed line). Due to inertia of the both the big moving core 203 and small moving core 202 together, duty cycle behaviour does not occur. The set point for opening the high flow valve can be adjusted by the spring tension of the outer spring. The opening of inner low flow valve by moving the small moving core 202 provides high precision for naturally aspirated mode and opening the outer high flow valve by moving the big moving core 203 gives the valve high flow capability. The package requirement of a valve with the invented features does not necessarily exceed the package boundaries of a standard conventional purge valve. With this invention the plumbing of the purge system will be simplified significantly compared to the version with two individual solenoid valves. This will furthermore lead to a cost advantage of the invention against a built solution.

Accordingly, the preferred embodiment of the present invention provides a dual valve assembly having dual path dual purging system said assembly comprising of:
 a. a housing (201) having an inlet (401) and an outlet (404) for purge flow;
 b. a fix core (208) fixed into said housing (201), said fix core having an upper end and a lower end, said upper end having at least one protruding extension (208a);
 c. a big moving core (203) placed at at least one big spring (205), wherein said big spring is placed around said extension (208a) of said fix core (208);
 d. a small moving core (202) placed within the big moving core (203), said small moving core placed on at least one small spring (204), wherein said small spring is placed on said extension (208a) of said fix core (208); and
 e. a threaded pin (207) inserted in the lower end of said fix core (208).

In another embodiment, the big moving core (203) is further comprising of a sealing rubber 210 and a core guider 211, where said sealing rubber 210 is placed on top of said big moving core to limit movement and is laterally supported via said core guider 211 that is further attached to the housing 201.

It is to be noted that the big moving core (203) and the small moving core (202) operate independently. Thus, in low flow duty cycle, the big moving core (203) is kept stationary and the small moving core (202) is adjusted to a preferred position, thereby allowing limited cross sectional availability for the purge flow through said inlet (401) and said outlet (404); in high flow mode, the big moving core (203) and the small moving core (202) are adjusted to their end positions, thereby allowing maximum cross section for the purge flow through said inlet (401) and said outlet (404); in de-energized state where no flow occurs, the big moving core (203) and the small moving core (202) are kept in default closed position by the small spring (204) and the big spring (205), thereby limiting the flow through said inlet (401) and said outlet (404). As a result, the dual valve assembly provides pressure compensation with precise metering for purge flow.

An advantageous embodiment of the invention is a machined sealing edge on the inner armature, which seals against the rubber of the outer armature. Thus, the inner armature is a machined metal component only, whereas the outer armature is an elastomeric composite part incorporating all required sealing areas of the purge valve.

We claim:
1. A dual valve assembly having dual path dual purging system said assembly comprising of:
 a. a housing (201) having an inlet (401) and an outlet (404) for purge flow;
 b. a fix core (208) fixed into said housing (201), said fix core having an upper end and a lower end, said upper end having at least one protruding extension (208a);
 c. a big moving core (203) placed at at least one big spring (205), wherein said big spring is placed around said extension (208a) of said fix core (208);
 d. a small moving core (202) placed within the big moving core (203), said small moving core placed on at least one small spring (204), wherein said small spring is placed on said extension (208a) of said fix core (208); and
 e. a threaded pin (207) inserted in the lower end of said fix core (208);
 wherein:
 said big moving core (203) further comprising of a sealing rubber (210) and a core guider (211), said sealing rubber (210) is placed on top of said big moving core to limit movement and is laterally supported via said core guider (211) that is further attached to the housing (201);
 the big moving core (203) and the small moving core (202) operate independently;
 in low flow duty cycle, the big moving core (203) is kept stationary and the small moving core (202) is adjusted to a preferred position, thereby allowing limited cross sectional availability for the purge flow through said inlet (401) and said outlet (404);
 in high flow mode, the big moving core (203) and the small moving core (202) are adjusted to their end positions, thereby allowing maximum cross section for the purge flow through said inlet (401) and said outlet (404);
 in de-energized state where no flow occurs, the big moving core (203) and the small moving core (202) are kept in default closed position by the small spring (204) and the big spring (205), thereby limiting the flow through said inlet (401) and said outlet (404); and
 the dual valve assembly provides pressure compensation with precise metering for purge flow.

2. The dual valve assembly as claimed in claim 1, wherein a ridged bobbin is optionally implemented in the housing (201).

3. The dual valve assembly as claimed in claim 1, wherein the big moving core (202) and the small moving core (203) are adjusted electronically for pressure compensation with precise metering.

4. The dual valve assembly as claimed in claim 1, wherein the assembly is coupled to a turbo boosted or super charged engine.

5. The dual valve assembly as claimed in claim 4, wherein the assembly enhances the overall efficiency of the engine.

6. The dual valve assembly as claimed in claim 1, wherein the assembly provides a cost effective purging system.

* * * * *